United States Patent
Hartog et al.

(10) Patent No.: US 10,067,030 B2
(45) Date of Patent: Sep. 4, 2018

(54) MULTIFIBER INTERROGATION WITH REFLECTOMETRY TECHNIQUES

(71) Applicant: Schlumberger Technology Corporation, Sugar Land, TX (US)

(72) Inventors: Arthur Hartog, Cambridge (GB); Paul Frederick Cilgrim Dickenson, Romsey (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/683,471

(22) Filed: Aug. 22, 2017

(65) Prior Publication Data

US 2018/0058982 A1 Mar. 1, 2018

Related U.S. Application Data

(60) Provisional application No. 62/380,877, filed on Aug. 29, 2016.

(51) Int. Cl.
| | |
|---|---|
| *G02B 6/00* | (2006.01) |
| *G01M 11/00* | (2006.01) |
| *G01D 5/26* | (2006.01) |
| *G01H 9/00* | (2006.01) |
| *G01K 11/32* | (2006.01) |
| *G01D 5/353* | (2006.01) |

(Continued)

(52) U.S. Cl.
CPC ......... *G01M 11/3136* (2013.01); *G01D 5/266* (2013.01); *G01D 5/35383* (2013.01); *G01D 21/02* (2013.01); *G01H 9/004* (2013.01); *G01K 11/32* (2013.01); *G01V 1/226* (2013.01)

(58) Field of Classification Search
CPC .... G01N 21/7703; G01H 9/004; G01L 1/246; G02B 6/00
See application file for complete search history.

(56) References Cited

U.S. PATENT DOCUMENTS

| | | | |
|---|---|---|---|
| 7,187,816 B2 * | 3/2007 | Huang | B82Y 20/00 385/12 |
| 7,668,411 B2 | 2/2010 | Davies et al. | |

(Continued)

FOREIGN PATENT DOCUMENTS

| | | |
|---|---|---|
| GB | 2122337 A | 1/1984 |
| WO | WO2014201316 A1 | 12/2014 |
| WO | WO2018022532 A1 | 2/2017 |

OTHER PUBLICATIONS

Götz, J., S. Lüth, J. Henninges, and T. Reinsch, 2015, Using a Fibre Optic Cable as Distributed Acoustic Sensor for Vertical Seismic Profiling at the Ketzin CO2 Storage Site, 77th EAGE Conference and Exhibition, Madrid, 1-4, 2015 (5 pages).

(Continued)

*Primary Examiner* — Jennifer Doan
(74) *Attorney, Agent, or Firm* — Michael Dae

(57) ABSTRACT

A system and method for simultaneously addressing multiple parallel distributed fiber optic sensors using a single interrogation instrument is disclosed. One or more of the fiber optic sensors are provided with a non-reflective delay element to prevent an overlap in time between backscatter returns from the distributed fiber optic sensors, thereby allowing the backscatter returns from each sensor to be distinguished based on round-trip transit time.

20 Claims, 4 Drawing Sheets

(51) Int. Cl.
*G01D 21/02* (2006.01)
*G01V 1/22* (2006.01)

(56) References Cited

U.S. PATENT DOCUMENTS

| | | | |
|---|---|---|---|
| 8,077,314 B2 | 12/2011 | Davies et al. | |
| 9,170,149 B2 | 10/2015 | Hartog et al. | |
| 2010/0040108 A1* | 2/2010 | Sasaoka | G01D 5/35303 |
| | | | 374/120 |
| 2016/0131520 A1 | 5/2016 | Martin et al. | |
| 2017/0010385 A1 | 1/2017 | Englich et al. | |

OTHER PUBLICATIONS

Rogers, A. J., Polarisation optical time-domain reflectometry. Jun. 19, 1980, Electron. Lett. 16: 13: 489-490.

Hartog, A. H., D. N. Payne, and A. J. Conduit, 1980, Polarisation optical-time-domain reflectometry: experimental results and application to loss and birefringence measurements in single-mode optical fibres, 6th European Conference on Optical Communication, York, UK, IEE, 190 (post-deadline): 5-8.

Iida, D., N. Honda, H. Izumita, and F. Ito. 2007. Design of identification fibers with individually assigned Brillouin frequency shifts for monitoring passive optical networks. J. Lightw. Technol. 25: 5: 1290-1297.

Chun-Kit, C., F. Tong, C. Lian-Kuan, S. Jian, and D. Lam. 1997. A practical passive surveillance scheme for optically amplified passive branched optical networks. Photonics Technology Letters, IEEE 9: 4: 526-528.

\* cited by examiner

MULTIFIBER INTERROGATION WITH REFLECTOMETRY TECHNIQUES

RELATED APPLICATIONS

This application claims priority to U.S. provisional application Ser. No. 62/380,877, filed Aug. 29, 2016, which is incorporated by reference herein in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. Information from the wells can prove valuable, but reliably obtaining useful information from the well can be difficult.

One manner in which information can be obtained from a well is to use a distributed fiber optic sensing system, such as a distributed temperature sensing system or a distributed vibration or acoustic sensing system. Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, and ruggedness. In addition, fiber optic sensors have the potential for very high sensitivity, and wide bandwidth. Yet further, certain classes of sensors can be distributed along the length of an optical fiber so that an appropriate interrogation system can be employed to monitor selected environmental parameters at multiple locations at the same time. For instance, when deployed in a hydrocarbon well, a fiber optic sensor can provide indications of characteristics of production fluids, such as temperature, fluid composition, density, viscosity, flow rate, etc. Or the sensor can provide information indicative of the operational state of downhole components, such as by monitoring vibration in the region proximate the components. Yet further, the sensor can provide information about characteristics of the earth formation penetrated by the well, such as be monitoring microseismic events.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

SUMMARY

Figure 1:
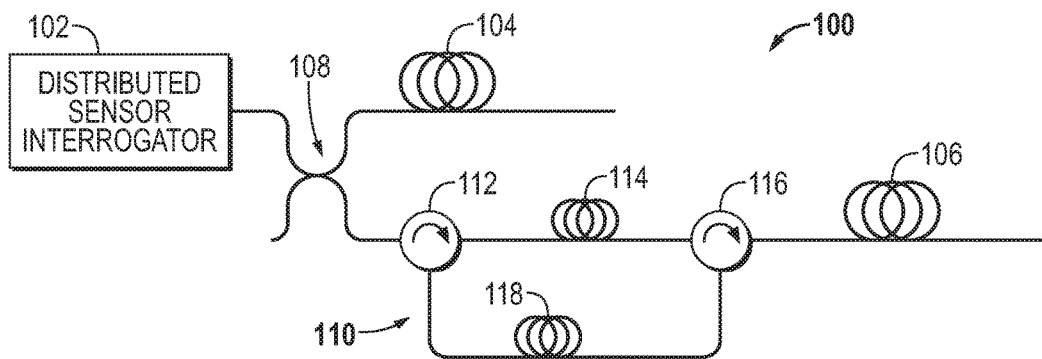
FIG. 1 is a schematic illustration of an example of a system to simultaneously address multiple parallel fiber optic sensors with a single interrogation instrument, according to an embodiment.

Certain embodiments of the present disclosure are directed to a distributed measurement system that includes first and second distributed fiber optic sensors deployed along respective measurement paths. A distributed sensing interrogation instrument is provided to simultaneously address the first and second distributed sensors with a probe signal. The system also includes a non-reflective delay element coupled between the interrogation instrument and the second distributed fiber optic sensor to introduce a delay sufficient to prevent interference between the backscatter returns from the first and second sensors in response to the probe signal.

Embodiments of the present disclosure are also directed to a method of obtaining reflectometric measurements from multiple parallel fiber optic sensors. The method includes providing a non-reflective delay in one of a first and a second sensor, and simultaneously addressing the multiple parallel sensors with a probe signal generated by a distributed fiber optic sensing instrument. The non-reflective delay prevents an overlap in time between the backscatter returns generated by the first and second sensors in response to the probe signal so that the backscatter returned from each of the first and second sensors is distinguishable by its round-trip transit time.

Embodiments of the present disclosure further are directed to a distributed measurement system for obtaining measurements from a plurality of parallel distributed fiber optic sensors deployed in one or more wellbores penetrating a hydrocarbon-bearing earth formation. The system includes a first distributed fiber optic sensor deployed in a wellbore, and a second distributed fiber optic sensor deployed in a wellbore. A distributed sensing interrogation instrument is deployed at the earth surface to simultaneously address the first and second sensors with a probe signal. A non-reflective delay element is coupled between the interrogation instrument and the second sensor to introduce a delay sufficient to prevent an overlap in time between the backscatters returned from the first and second sensors in response to the probe signal.

DETAILED DESCRIPTION

In the following description, numerous details are set forth to provide an understanding of the present invention.

However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Distributing sensing systems and techniques for addressing a single fiber optic deployed in a region of interest are well known. Systems and techniques also are known for addressing multiple sensing fibers using a single distributed sensing interrogation instrument. For example, arrangements are known in which a probe pulse generated by the interrogation instrument is split into separate paths for each sensing fiber, and then the backscatter from each fiber is directed to a separate receiver and acquisition sub-system for that fiber. Although this arrangement shares the cost of some of the optics, it does not allow a standard interrogation instrument to be used "as is" to address multiple fibers.

Distributed temperature sensor (DTS) systems also are known in which the interrogation instrument is designed to address multiple sensing fibers. For example, a DTS instrument can address multiple fibers by means of a fiber switch that selectively couples the instrument to each fiber in turn, addressing each fiber one at a time. In applications where the measurand changes slowly, the time between measurements in such an arrangement generally may be acceptable; however, the time delay may not be acceptable in applications in which a continuous or very fast response is desired.

Distributed vibration sensor (DVS) systems also are known for addressing multiple fibers. For example, multiple fibers can be deployed in multiple shallow wells in close proximity to each other, and each fiber can be looped back at the bottom of the well so that both ends of the fiber are accessible at the surface, thus forming a double-ended fiber. The multiple fibers then can all be joined end to end, forming a single fiber assembly extending down and up each well in turn. Although a single DVS instrument can be used to simultaneously address the joined fibers, this arrangement is limited to applications in which the installed sensing fibers are double-ended.

Accordingly, embodiments of the systems and techniques disclosed herein are directed to arrangements that allow reflectometric measurements to be accomplished on multiple parallel sensing fibers using a single interrogation instrument to simultaneously address the multiple, parallel fibers having different configurations including single-ended sensing fibers. The measurements can be performed without mutual interference even where all fibers have similar backscatter factors. In embodiments, the systems and techniques disclosed herein include providing a non-reflective delay in one or more of the sensing fibers. The delay is selected for each of the one or more sensing fibers in order to prevent the backscatter returns from fiber sections of interest from overlapping in time. The backscatter from each fiber can then be distinguished by its round-trip transit time. By providing a non-reflective delay, interference between backscatter generated by a delay element associated with a first sensing fiber and the backscatter generated by a second sensing fiber can be avoided.

FIG. 1 schematically illustrates an example of a multi-fiber distributed sensing system 100 according to an embodiment. System 100 includes a distributed sensor interrogation instrument 102 for addressing at least two sensing fibers 104 and 106. Instrument 102 can be a distributed temperature sensor interrogation instrument, a distributed vibration sensor interrogation instrument, a distributed acoustic sensor interrogation instrument, or other distributed sensor interrogation instrument known presently or in the future. In general, the instrument 102 includes an optical source to launch optical probe signals into each of the sensing fibers 104 and 106, a detector or receiver to receive backscatter generated by the fibers 104, 106 in response to the probes, and may also include an acquisition system to acquire from the received backscatter information corresponding to a measurand of interest, such as temperature, vibration, strain, etc.

In the embodiment illustrated in FIG. 1, the output of the interrogation instrument 102 is split into two paths by a splitting coupler 108. The first path through coupler 108 (i.e., the upper path in FIG. 1) is connected directly to the first sensing fiber 104. The backscatter generated by fiber 104 in response to a probe signal returns through the splitting coupler 108 and thence to the interrogation instrument 102. In the second path through the coupler 108 (i.e., the lower path in FIG. 1), a delay element 110 is introduced between the coupler 108 and the fiber 106. The delay element 110 includes a probe path along which the probe light passes through an optical component, such as a circulator 112, and then through a first delay fiber 114. The circulator 112 blocks any backscatter generated by the first delay fiber 114 in response to the probe light from returning to the interrogation system 102. The first delay fiber 114 is provided to delay the arrival of the probe light to the second sensing fiber 106. Before entering the second sensing fiber 106, the probe light passes through a second circulator 116.

The delay element 110 also includes a return path for the backscatter generated by the sensor 106 in response to the probe light comprising a second delay fiber 118. In the return path, the circulator 116 blocks the path through the first delay fiber 114 and directs the backscatter from the sensing fiber through the second delay fiber 118. The backscatter then travels through the circulator 112 and the splitting coupler 108 to the interrogation instrument 102.

The arrangement 100 thus provides a non-backscattering time-delay because the backscatter generated in the first delay fiber 114 is prevented from returning to the interrogation instrument 102. The backscatter from the second sensing fiber 106 has a dedicated path through the second delay fiber 118.

In the embodiment shown, the amount of delay introduced by the delay element 110 is at least equal to the round-trip transit time of light in fiber 104 in order to prevent overlap at the instrument 102, and thus interference, between the backscatter received from the fibers 104 and 106. As such, the combined lengths of delay fibers 114, 118 should be equal to at least twice the length of sensing fiber 104. For example, the lengths of delay fibers 114, 118 could be equal, or one of the fibers 114, 118 could be removed and the length of the other delay fiber 114 or 118 could be at least twice the length of sensing fiber 104.

Figure 2:
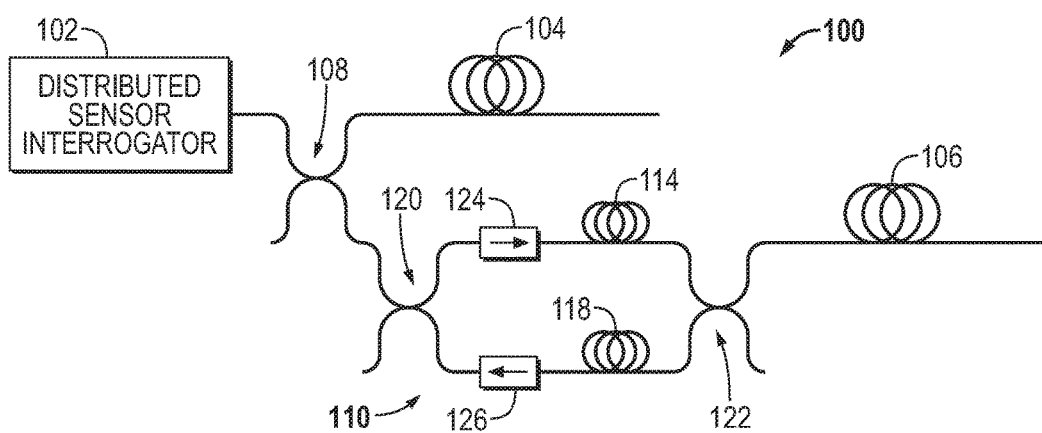
FIG. 2 is a schematic illustration of another example of a system to simultaneously address multiple parallel fiber optic sensors, according to an embodiment.

FIG. 2 schematically illustrates another embodiment of the system 100. In this embodiment, circulators 112, 116 in the delay element 110 are replaced with directional couplers 120, 122 and isolators 124, 126. The probe light for addressing the second sensing fiber 106 passes through the directional couplers 108 and 120, the isolator 124, the first delay fiber 114, and then through the directional coupler 122. The isolator 124 prevents backscatter from the first delay fiber 114 from returning to the interrogation instrument 102. The backscatter from the second sensing fiber 106 returns to the instrument 102 through the directional coupler 122, the second delay fiber 118, the isolator 126 and the directional couplers 122 and 108. Again, to avoid interference between the received backscatter, the sum of the lengths of the delay fibers 114 and 118 is at least twice the length of the first sensing fiber 104. Although the use of couplers and isolators in place of circulators introduces higher losses, the arrangement of FIG. 2 still accomplishes the same result as the arrangement shown in FIG. 1.

As shown, the system 100 in FIGS. 1 and 2 includes only two sensing fibers 104, 106. However, the arrangement can be extended for use with more than two sensing fibers by providing additional delay elements 110 using additional optical couplers or a coupler with more than two input and output ports and circulator/delay fiber combinations. In such embodiments, the total length of the delay fibers in each delay element 110 is increased in length for each incremental sensing fiber. Thus, for example, the total length of the delay element 110 for a third sensing fiber is greater than the sum of the length of the second sensing fiber and the length of the delay element 110 corresponding to the second sensing fiber, and so on.

Although the arrangement 100 shown in FIGS. 1 and 2 provides for simultaneous addressing of multiple fibers using a single distributed sensing instrument, it does introduce an additional splitting loss (relative to a single sensing fiber system) that applies in both directions. Thus, if splitter 108 is a 50/50 splitter, the backscatter power is reduced by a factor of 4 relative to a single sensing fiber configuration. However, in many systems, the probe power is limited by optical non-linearity considerations and in this case, provided that the splitter 108 is sited close to the interrogator 102, the probe power can be increased to approximately cancel the outgoing losses. In such an embodiment, the backscatter power received from the first sensing fiber 104 is reduced by a factor of 2 only. In the case of systems employing coherent detection techniques, the effective degradation of the signal-to-noise ratio would be $2^{1/2}$. However, other techniques that do not employ coherent detection can also be used in the context of the invention.

The second sensing fiber 106 suffers further additional losses from the insertion of the two circulators 112, 116. Assuming that these losses amount to 2 dB in each direction (including splice losses and propagation losses in the delay fibers 114, 118), then in the case of a two-sensing fiber embodiment, the optimum splitting ratio S for the coupler 108 is:

$$S_{opt} = \frac{\sqrt{T}}{1+\sqrt{T}}$$

where "T" is the total two-way loss for the circulators 112, 116 and delay fibers 114, 118. Thus for "T=1" (i.e. zero excess loss), the optimum splitting ratio for coupler 108 is 50/50 ($S_{opt}$=0.5). However, for "T=0.4" (corresponding to approximately 4 dB two-way excess loss), $S_{opt}$≈0.38, and the splitting ratio of the coupler 108 may be adapted accordingly. In this case the additional loss seen for either sensing fiber 104, 106 is about 8.2 dB. As mentioned, the excess loss can be mitigated by increasing the probe power.

It could also be mitigated by optical amplification or the use of sensing fibers exhibiting stronger backscatter coefficients (in the case particularly of sensors using coherent Rayleigh backscatter).

It should also be understood that embodiments of the arrangement 100 can be used in conjunction with any distributed sensing technique, for example using coherent Rayleigh backscatter (including polarization analysis), Brillouin backscatter or Raman backscatter. In addition to providing information regarding measurements of interest, the arrangement 100 also can be applied to identifying fibers in star networks, such as networks that connect homes to internet service providers. In such applications, the systems and techniques disclosed herein can be used to identify which of the parallel fibers in the star network has developed a fault.

The systems and techniques disclosed herein also can be used in conjunction with different types of sensing fibers, including both single mode and multimode fibers. For example, components such as circulators, isolators and directional couplers are available for multimode fiber and can be used in embodiments of the arrangements disclosed herein. In addition, methods for interrogating multimode fibers with interrogation techniques that fundamentally require single-mode fiber within the instrumentation are known, notably for Brillouin backscatter and distributed vibration sensing based on coherent interrogation and Rayleigh backscattering.

The techniques disclosed herein also are not limited to any particular interrogation method. Although many known interrogation instruments are based on time domain reflectometry method, the techniques disclosed herein can be employed for example for optical frequency domain reflectometry or systems employing pulse compress coding.

Yet further, embodiments of the systems and techniques disclosed herein can be particularly useful in applications in which it is desired to interrogate a number of relatively short, single-ended fibers. One example of such an application is distributed vibration sensing where many shallow wells within a region are interrogated, such as for detecting and locating microseismic events. These wells sometimes reach only a few hundred feet. Known systems for using a single instrument to address the multiple fibers require looping each of the fibers in the wells and then concatenating the fibers. Implementation of the systems and techniques disclosed herein allows multiple single-ended parallel fibers to be simultaneously interrogated without the need for installing a looped fiber, which simplifies the cable design and particularly avoids a complicated down-hole turn around. An example of such an application is shown schematically in FIG. 3.

Figure 3:
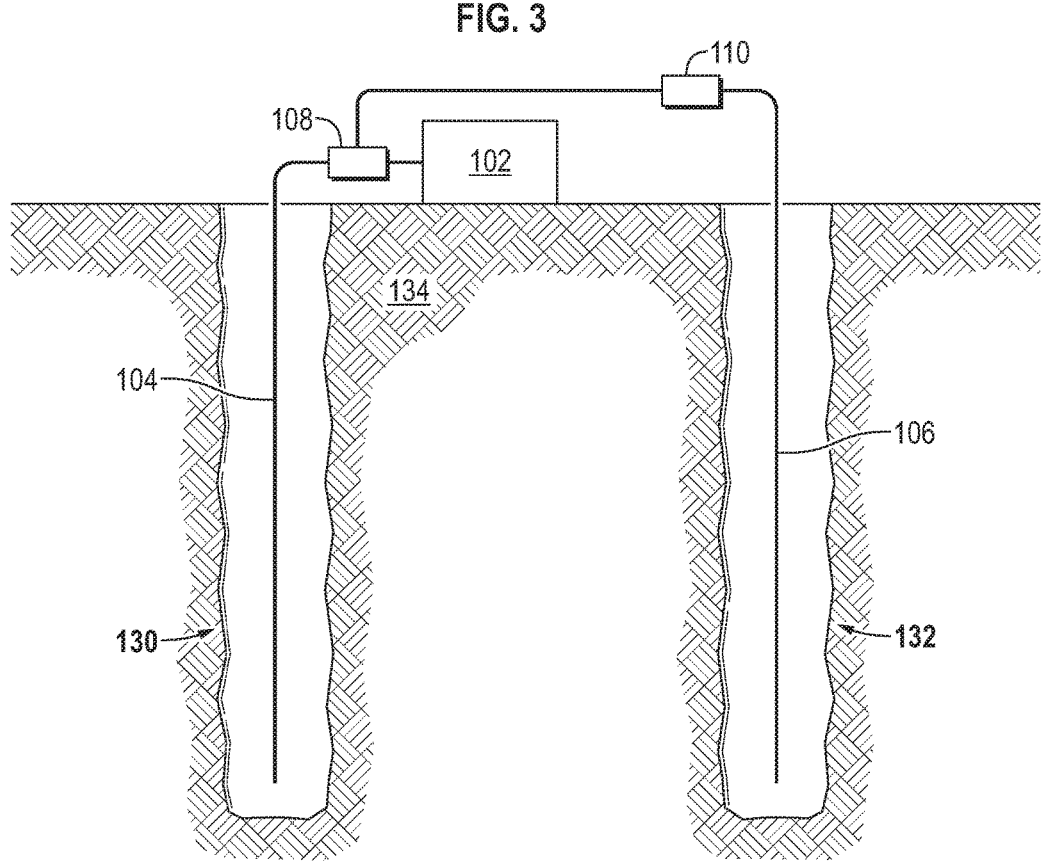
FIG. 3 is a schematic illustration of a multi-well application in which the systems of FIGS. 1 and 2 can be implemented, according to an embodiment.

In FIG. 3, two shallow wells 130, 132 penetrate an earth formation 134. The first fiber sensor 104 is deployed in well 130 and the second fiber sensor 106 is deployed in well 132. The sensors 104 and 106 are coupled to the distributed sensor interrogator 102 at the surface via the splitter coupler 108 and the delay element 110 (which can include, for example, the circulators 112, 116 and the delay fibers 114, 118).

Figure 4:
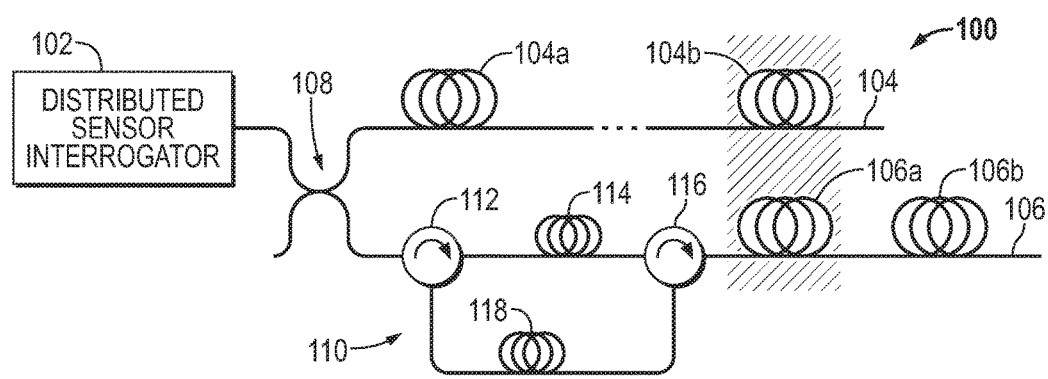
FIG. 4 is a schematic illustration of a variant of the multi-fiber interrogation system of FIG. 1, according to an embodiment. A similar variant may be applied to the system of FIG. 2.

The systems and techniques disclosed herein can also be implemented with longer sensing fibers where only a limited section of the fibers is of interest. Because only limited sections of the fibers are of interest, the delayed backscatter from one fiber can be allowed to overlap with the backscatter from another, reducing the total effective fiber length and the length over which data must be acquired. An example of such an arrangement is shown schematically in FIG. 4, and an example application of this approach would be the monitoring of multiple downhole pumps, each in a separate well accessed from one pad. In such an application, only the sections of fiber next to the pump in each well is of interest. Consequently, backscatter from the sections of fiber that are not of interest can be allowed to overlap. For example, as shown in FIG. 4, section 104a of fiber 104 is proximate a pump in a first well, and section 106b of fiber 106 is proximate a pump in a second well. The delay element 110 then can be configured so that backscatter from sections 104a and 106b do not overlap, while backscatter from sections 104b and 106a can be allowed to overlap.

Figure 5:
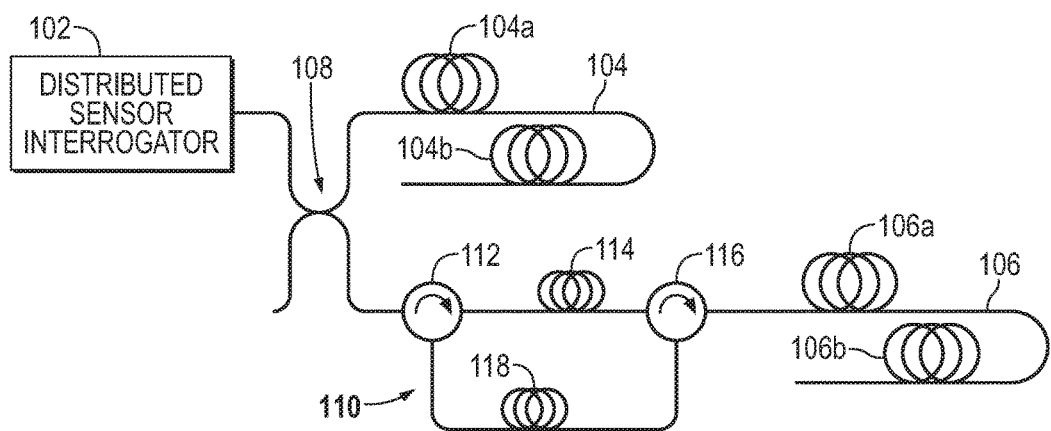
FIG. 5 is a schematic illustration of yet another variant of the system of FIG. 1, according to an embodiment. A similar variant may also be applied to the system of FIG. 2.

In yet another application, the systems and techniques disclosed herein can be used in conjunction with double-ended fibers. For example, FIG. 5 schematically illustrates fibers 104 and 106 as double-ended fibers, each of which can be deployed in a separate wellbore and looped back so that both ends of the fiber are available for measurement by a surface instrument. Section 104a represents the length of fiber 104 extending from the surface towards the bottom of the well, and section 104b represents the length of fiber 104 returning from the bottom of the well to the surface. Likewise, section 106a represents the downwardly extending length of fiber 106, and section 106b corresponds to the upwardly extending length of fiber 106. Optionally, instead of concatenating the fibers to allow interrogation by one instrument, system 100 can be used with backscatter permitted to overlap. This approach can reduce the length of fiber to be monitored if only one section of each well is of interest. For example, with reference to FIG. 5, backscatter from the upwardly extending length 104b of fiber 104 can be permitted to overlap with the downwardly extending length 106a of fiber 106 by adjustment of the length of the delay fibers 114 and 118.

Embodiments of the systems and techniques disclosed herein can also be implemented to monitor multiple fibers in a single well. Such an arrangement can introduce diversity to reduce the impact of optical fading, as well as improve the signal-to-noise ratio through stacking of the data. These features are particularly relevant for microseismic event detection where the events are of low amplitude and occur at random, preventing stacking over time. Conventionally, multiple fibers in one well must be looped together so they can be interrogated using one instrument. However, with the systems and techniques described herein, the fibers can be addressed using one instrument without downhole fiber connections. Such an approach reduces complexity of installation and improves the robustness of the down-hole equipment. An example of an embodiment of arrangement 100 deployed to monitor multiple fibers in a single well is shown schematically in FIG. 6.

Figure 6:
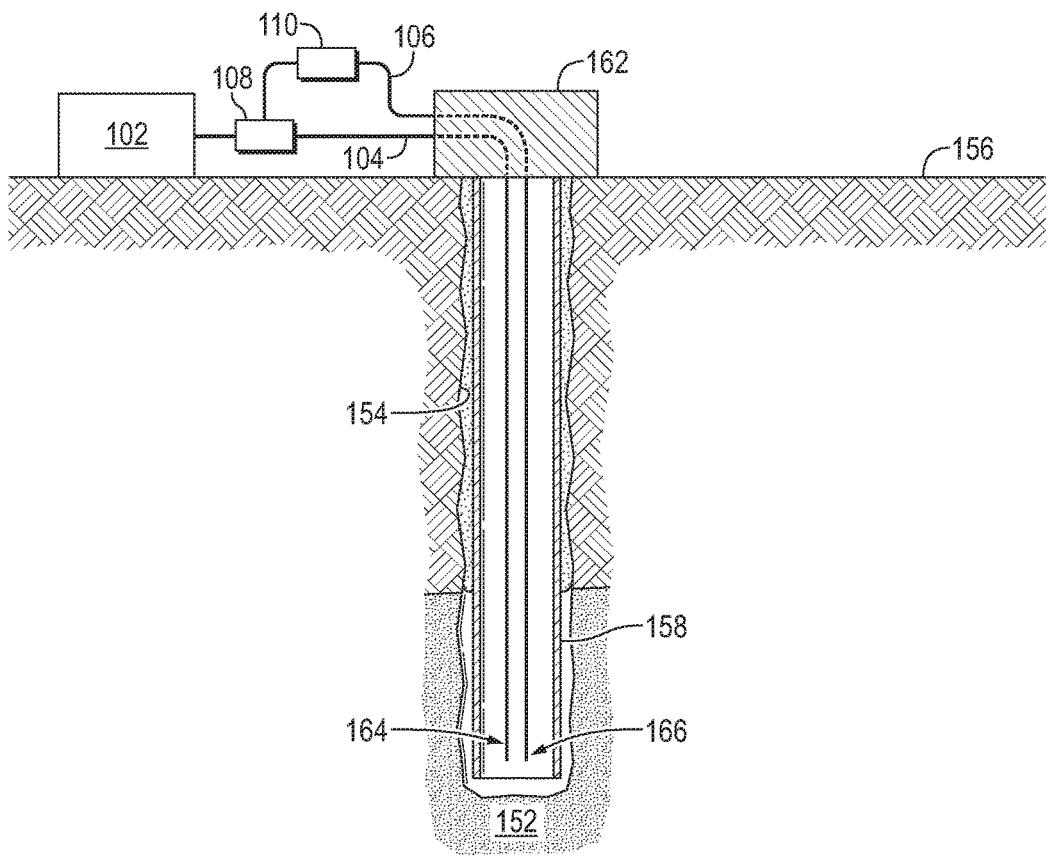
FIG. 6 is a schematic illustration of an application of FIG. 1 or 2 in which multiple parallel sensing fibers are deployed in a single wellbore, according to an embodiment.

Turning to FIG. 6, a cross-sectional, schematic representation of a well 150 that penetrates a subterranean formation 152 is shown. The well 150 is formed by drilling a borehole 154 through the surface 156 so that it penetrates the subterranean formation 152. A casing 158 can then be lowered and set in place. In FIG. 6, fiber optic sensors 104 and 106 are deployed in the well 150 to measure parameters of interest. The sensors 104, 106 extend through a wellhead 162 and terminate at far ends 164, 166 at a depth in the borehole 154. Although a cased well structure is shown, it should be understood that embodiments of this disclosure are not limited to this illustrative example. Uncased, open hole, gravel packed, deviated, horizontal, multi-lateral, deep sea or terrestrial surface injection and/or production wells (among others) may incorporate the systems and techniques as described. Further, the fiber optic sensors 104, 106 can be permanently installed in the well 150 or can be removably deployed in the well, such as for use during remedial operations.

The fiber optic sensors 104, 106 110 can be contained within a protective casing or a conduit (e.g., a control line). As shown in FIG. 6, the fiber optic sensors 104, 106 are coupled to the distributed sensor interrogator 102 at the surface, which is arranged to address the fibers 104 via splitter coupler 108 and delay element 110 (which includes, for example, circulators 112, 116 and delay fibers 114, 118).

Embodiments of the systems and techniques disclosed herein further can be applied to a cable containing multiple fibers that are wound in different configurations to give varying directional sensitivity. Such cable may for instance include a wireline or slickline cable. Conventionally, the multiple fibers would have to be joined at the far end so as to allow interrogation using one instrument. However, using the systems and techniques described herein, all fibers in the cable can be interrogated using a single instrument without a turn-around at the far end.

Yet further applications of embodiments of the systems and techniques disclosed herein can be in distributed temperature sensing. Some DTS systems require the use of many short fibers for the measurement, for example for probing inside large electrical machines, such as in generator stator bars. Likewise, in nuclear waste storage applications, it is advisable to use many short fibers rather than few long ones owing to the radiation-induced losses that can occur. Provided that the delay fibers are shielded from the radiation environment, the approach disclosed here allows a longer overall length of sensing fiber to be used.

Figure 7:
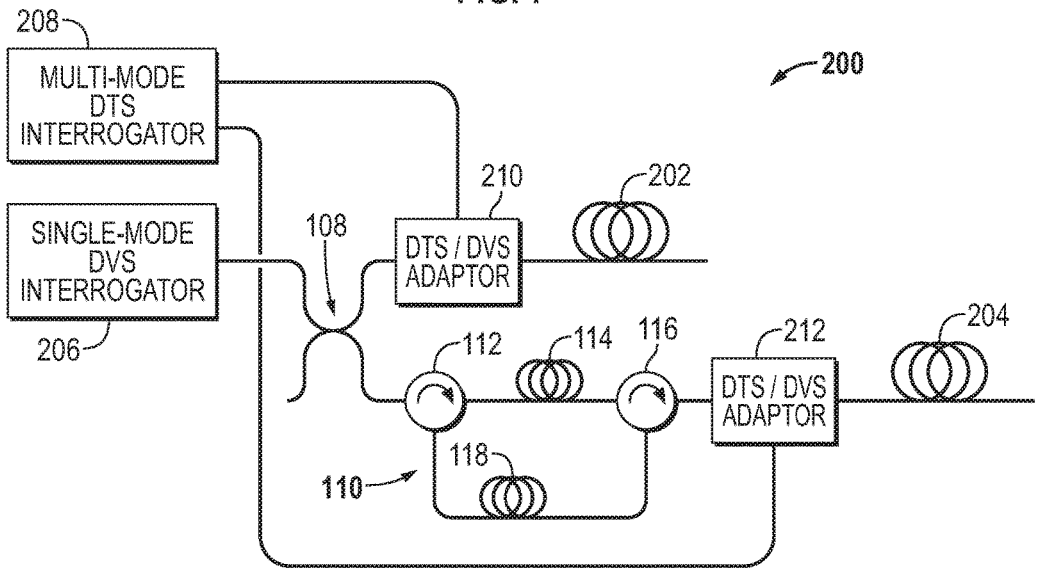
FIG. 7 is a schematic illustration of an extension of the system of FIG. 1 in which two different types of interrogation instruments each simultaneously address the same parallel sensing fibers, according to an embodiment. A similar extension may be applied to the system of FIG. 2.

Embodiments of the present disclosure can be used in conjunction with an arrangement that includes both a DTS and a DVS instrument that provide for quasi-simultaneous interrogation of the same sensing fibers. As shown schematically in the arrangement 200 of FIG. 7, two short sensing fibers 202 and 204 (e.g., multimode fibers) are multiplexed onto a single DVS instrument 206, which, in this embodiment, is configured as a single-mode interrogator. The same sensing fibers 202, 204 are also connected to a multimode DTS instrument 208. As shown in FIG. 7 the DTS instrument 208 and DVS instrument 206 are connected to the sensing fibers 202 and 204 via adaptor elements 210, 212, which each can include a wavelength division multiplexor to combine the different interrogation pulses launched into the sensing fibers 202, 204 by the instruments 206, 208, and to split the backscatter received from the sensing fibers 202, 204 and direct the split portions to the appropriate measuring instrument 206, 208.

Figure 8:
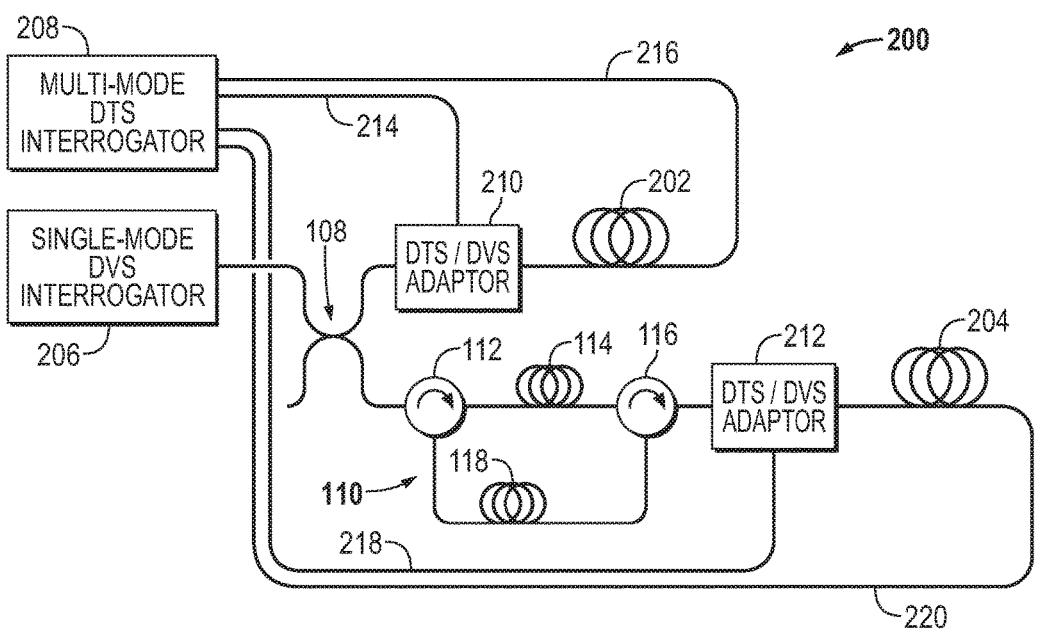
FIG. 8 is a schematic illustration of yet another extension of the system of FIG. 1 in which two different types of interrogation instruments each simultaneously address the same parallel sensing fibers, according to an embodiment. A similar extension may be applied to the system of FIG. 2.

FIG. 8 schematically illustrates yet another embodiment of arrangement 200 where both the DTS instrument 208 and DVS instrument 206 are configured to interrogate the same multimode sensing fibers 202, 204. In this embodiment, the DTS measurement is a double-ended measurement, while the DVS measurement is single-ended. That is, the DTS instrument 208 is connected to both a first end 214 and a second end 216 of fiber 202, and to both a first end 218 and a second end 220 of fiber 204.

The example applications described above are only some of the myriad options that are possible. As discussed above, more than two sensing fibers can be addressed simultaneously by extending the arrangement of FIG. 1, by replacing the splitting coupler with a device having more than two input and output ports and replicating the delay element. Likewise, arrangements disclosed herein can readily be adapted to use single mode sensing fibers, multi-mode sensing fibers or both, and any of a DTS, DVS and DAS instrument or a combination of instruments can be used.

In some embodiments, the systems and techniques described herein can be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system can comprise one or more of various components or subsystems, which include without limitation: casing, tubing, control lines (electric, fiber optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well can communicate with systems or sub-systems that are located at the surface. The surface systems or sub-systems in turn can communicate with other surface systems, such as systems that are at locations remote from the well.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A distributed measurement system, comprising:
a first distributed fiber optic sensor deployed along a first measurement path;
a second distributed fiber optic sensor deployed along a second measurement path;
a distributed sensing interrogation instrument to simultaneously address the first and second distributed fiber optic sensor with a probe signal; and
a non-reflective delay element coupled between the distributed sensing interrogation instrument and the second distributed fiber optic sensor to introduce a delay sufficient to prevent interference between backscatter returned from the first distributed fiber optic sensor and backscatter returned from the second distributed fiber optic sensor in response to the probe signal.

2. The system as recited in claim 1, wherein the delay prevents an overlap in time between backscatter returned from the second distributed fiber optic sensor and only backscatter returned from a first section of the first distributed fiber optic sensor that is deployed along the first measurement path.

3. The system as recited in claim 1, wherein the non-reflective delay element comprises a first optical path to direct the probe signal to the second distributed fiber optic sensor and a second optical path to direct the backscatter returned in response to the probe signal to the distributed sensing interrogation instrument.

4. The system as recited in claim 1, wherein the first optical path includes a first delay fiber, and the second optical path includes a second delay fiber, wherein the delay is introduced by a combined length of the first and second delay fibers.

5. The system as recited in claim 4, wherein the combined length of the first and second delay fibers is greater than twice a length of the first distributed fiber optic sensor.

6. The system as recited in claim 4, wherein the non-reflective delay element comprises a circulator to block backscatter returned from the first delay fiber in response to the probe signal.

7. The system as recited in claim 6, wherein the optical component is a circulator or a directional coupler.

8. The system as recited in claim 1, wherein the distributed sensing interrogation instrument is a distributed temperature sensing instrument.

9. The system as recited in claim 1, wherein the distributed sensing interrogation instrument is a distributed vibration temperature sensing instrument.

10. The system as recited in claim 9, further comprising a distributed temperature sensing instrument coupled to each of the first and second distributed fiber optic sensors, wherein the distributed temperature sensing instrument obtains measurements from the first and second sensors quasi-simultaneously with the distributed vibration temperature sensing instrument obtaining measurements from the first and second sensors.

11. The system as recited in claim 1, further comprising:
a third distributed fiber optic sensor deployed along a third measurement path;
a second non-reflective delay element coupled between the distributed sensing interrogation instrument and the third distributed fiber optic sensor to introduce a delay sufficient to prevent interference between backscatter returned from the third distributed fiber optic sensor and backscatter returned from the first and second distributed fiber optic sensors in response to the probe signal.

12. A method of obtaining reflectometric measurements from multiple parallel fiber optic sensors, comprising:
providing a non-reflective delay in one of a first and a second sensor of the multiple parallel fiber optic sensors; and
simultaneously addressing the multiple parallel fiber optic sensors with a probe signal generated by a distributed fiber optic sensing interrogation instrument, wherein the non-reflective delay prevents an overlap in time between the backscatter returns generated by the first and second parallel fiber optic sensors in response to the probe signal so that the backscatter returned from each of the first and second parallel fiber optic sensors is distinguishable by its round-trip transit time.

13. The method as recited in claim 12, further comprising: providing a different non-reflective delay in a third sensor of the multiple parallel fiber optic sensors to prevent an overlap in time between the backscatter returns generated by first, second and third parallel fiber optic sensors.

14. The method as recited in claim 12, wherein providing the non-reflective delay comprises providing a non-reflective delay element having a first non-reflective delay path to direct the probe signal to the one of the first and second sensors and a second non-reflective delay path to direct the backscatter return generated by the one of the first and second sensors to the distributed fiber optic sensing interrogation instrument.

15. The method as recited in claim 14, wherein a combined time delay introduced by the first and second delay paths is greater than a round trip transit time of light in the other of the first and second sensors.

16. The method as recited in claim 12, wherein the first and second sensors are deployed in first and second wellbores.

17. The method as recited in claim 12, wherein the first and second sensors are deployed in a wellbore penetrating an earth formation.

18. A distributed measurement system for obtaining measurements from a plurality of parallel distributed fiber optic sensors deployed in one or more wellbores penetrating a hydrocarbon-bearing earth formation, comprising:
- a first distributed fiber optic sensor deployed in a wellbore;
- a second distributed fiber optic sensor deployed in a wellbore;
- a distributed sensing interrogation instrument deployed at the earth surface to simultaneously address the first and second distributed fiber optic sensor with a probe signal; and
- a non-reflective delay element coupled between the distributed sensing interrogation instrument and the second distributed fiber optic sensor to introduce a delay sufficient to prevent an overlap in time between backscatter returned from the first distributed fiber optic sensor and backscatter returned from the second distributed fiber optic sensor in response to the probe signal.

19. The system as recited in claim 18, wherein the first and second distributed fiber optic sensors are deployed in the same wellbore.

20. The system as recited in claim 18, wherein the distributed sensing interrogation instrument is a distributed temperature sensing instrument, and wherein the system further comprises a distributed vibration sensing instrument to simultaneously address the first and second distributed fiber optic sensors, wherein the distributed temperature sensing instrument and the distributed vibration sensing instrument obtain measurements from the first and second distributed fiber optic sensors quasi-simultaneously.

\* \* \* \* \*